United States Patent
Wang et al.

(10) Patent No.: US 7,489,251 B2
(45) Date of Patent: Feb. 10, 2009

(54) REAL-TIME TRACING, TRANSMITTING AND ANALYZING SYSTEM FOR FLIGHT ANIMALS

(75) Inventors: Bily Wang, Hsin Chu (TW);
Chung-Hsien Su, Tai Nan (TW);
Yuan-Hsiu Yang, Kao Hsiung (TW)

(73) Assignee: Youngtek Electronics Corporation, Hsinchu (TW)

( * ) Notice: Subject to any disclaimer, the term of this patent is extended or adjusted under 35 U.S.C. 154(b) by 206 days.

(21) Appl. No.: 11/455,212

(22) Filed: Jun. 19, 2006

(65) Prior Publication Data

US 2007/0290866 A1 Dec. 20, 2007

(51) Int. Cl.
*G08B 23/00* (2006.01)

(52) U.S. Cl. ............. 340/573.1; 340/573.3; 342/357.07

(58) Field of Classification Search ............... 340/573.1, 340/573.3, 539.13; 342/357.06, 357.07
See application file for complete search history.

(56) References Cited

U.S. PATENT DOCUMENTS

| | | | | |
|---|---|---|---|---|
| 6,172,640 B1 * | 1/2001 | Durst et al. | ............ | 342/357.07 |
| 6,185,427 B1 * | 2/2001 | Krasner et al. | ......... | 342/357.09 |
| 6,236,358 B1 * | 5/2001 | Durst et al. | ............ | 342/357.07 |
| 6,441,778 B1 * | 8/2002 | Durst et al. | ............ | 342/357.07 |
| 6,677,894 B2 * | 1/2004 | Sheynblat et al. | ......... | 342/357.1 |
| 2002/0021219 A1 * | 2/2002 | Edwards | ................... | 340/573.1 |
| 2004/0162875 A1 * | 8/2004 | Brown | ......................... | 709/203 |
| 2005/0285790 A1 * | 12/2005 | Gagnon | ...................... | 342/457 |
| 2007/0107668 A1 * | 5/2007 | Eaton et al. | ................. | 119/719 |
| 2007/0221140 A1 * | 9/2007 | Warren et al. | ............... | 119/859 |
| 2007/0266959 A1 * | 11/2007 | Brooks | ........................ | 119/720 |
| 2008/0001815 A1 * | 1/2008 | Wang et al. | ............ | 342/357.07 |
| 2008/0036610 A1 * | 2/2008 | Hokuf et al. | ............. | 340/573.3 |
| 2008/0055154 A1 * | 3/2008 | Martucci et al. | ......... | 342/357.1 |

* cited by examiner

*Primary Examiner*—John A Tweel, Jr.
(74) *Attorney, Agent, or Firm*—Rosenberg, Klein & Lee

(57) ABSTRACT

A real-time tracing, transmitting and analyzing system for flight animals is disclosed. The real-time tracing, transmitting and analyzing system has a tracing and transmitting device with a weight between 1 and 10 grams. The tracing and transmitting device is fastened on any part of a flight animal's body (the flight animal's concave ring portion between its body and tail is most suitable), for capturing real-time flight information (such as location, height, flight velocity, and the physical and mental states of the flight animal) of the flight animal by using GPS. Moreover, the real-time flight information is transmitted via a base station to a flight information-analyzing device for immediately displaying the real-time flight information regarding each flight animal for reference via the flight information-analyzing device. Thereby, in a pigeon race, for example, breeders can obtain any real-time flight information that they desire regarding each flight animal.

8 Claims, 3 Drawing Sheets

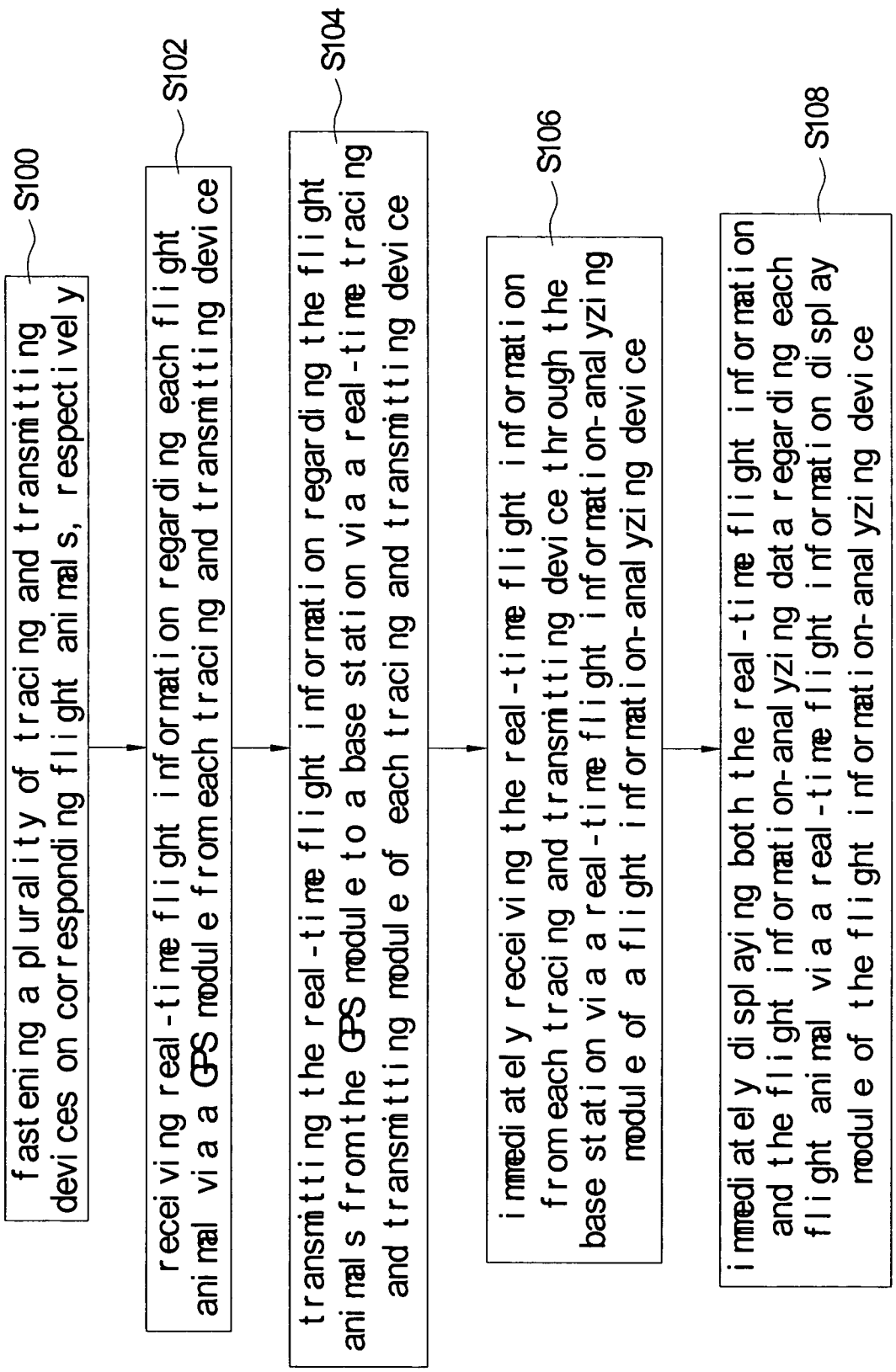

REAL-TIME TRACING, TRANSMITTING AND ANALYZING SYSTEM FOR FLIGHT ANIMALS

BACKGROUND OF THE INVENTION

1. Field of The Invention

The present invention relates to a real-time tracing, transmitting and analyzing system for flight animals and a method of using the same, and particularly relates to a tracing and transmitting device that can be fastened on a flight animal. The tracing and transmitting device is mated with a flight information-analyzing device for immediately displaying real-time flight information regarding the flight animal.

2. Description of the Related Art

In ancient times, people delivered letters using doves (or homing pigeons). The main reason for this was that these birds have the natural ability to recognize and find their way back home. Although we now live in the telecommunication age, these birds are still used and reared because they symbolize peace and due to their natural ability to recognize and find their way back home. For example, peace doves are often used in national celebrations, and racing pigeons are often involved in races for honor and awards.

Every dove breed for racing needs to be trained for a long time to achieve excellence in competitions. Therefore, breeders give doves flight training, such as flying around dovecots or certain places, everyday for physical exercise.

Sometimes racing doves take a rest in the middle of a race when breeders cannot see them and this lessens the benefits of training. The method of training the birds usually involves waving red flags to keep the birds flying. However, it is not easy to control the flight path around certain terrains. The gaining of flight orbit and references (height, speed etc.,) is even harder.

In a dove race, any real-time flight information concerning each flight animal is highly valuable to breeders. Such information includes real-time location, real-time height, a real-time flight velocity and the physical and mental state of each flight animal. Even how far each flight animal is from its destination is important information for a breeder to know. However, the prior art electronic sensor was able to even inform the breeder when a dove had arrived at its destination or not only.

SUMMARY OF THE INVENTION

The present invention provides a real-time tracing, transmitting and analyzing system for flight animals and a method of using the same. A tracing and transmitting device of the real-time tracing, transmitting and analyzing system has a weight of between 1 and 10 grams and is fastened on any part of a flight animal's body (however, the best position is the concave ring portion between the body and the tail of the flight animal), for capturing real-time flight information (such as real-time location information, real-time height information, a real-time flight velocity, and the physical and mental state of the flight animal) of the flight animal by using GPS.

Moreover, the real-time flight information is transmitted via a base station to a flight information-analyzing device and is analyzed via the flight information-analyzing device to obtain flight information-analyzing data. Hence, the present invention can immediately display both the real-time flight information and the flight information-analyzing data of each flight animal for reference via the flight information-analyz-ing device. For example, in a pigeon race, breeders can get any real-time flight information that they want for each flight animal.

A first aspect of the present invention is a real-time tracing, transmitting and analyzing system for flight animals comprising: a plurality of tracing and transmitting devices and a flight information-analyzing device. Each tracing and transmitting device is fastened on a flight animal, and has a GPS module for receiving real-time flight information of the flight animal and a real-time tracing and transmitting module for transmitting the real-time flight information of the flight animal from the GPS module to a base station.

Moreover, the flight information-analyzing device has a real-time flight information-analyzing module for immediately receiving the real-time flight information from each tracing and transmitting device through the base station and analyzing the real-time flight information to obtain flight information-analyzing data, and a real-time flight information display module for immediately displaying both the real-time flight information and the flight information-analyzing data of each flight animal.

A second aspect of the present invention is a method of using a real-time tracing, transmitting and analyzing system for flight animals, comprising: fastening a plurality of tracing and transmitting devices on corresponding flight animals; receiving real-time flight information regarding each flight animal via a GPS module of each tracing and transmitting device; transmitting the real-time flight information regarding the flight animals from the GPS module to a base station via a real-time tracing and transmitting module of each tracing and transmitting device; immediately receiving the real-time flight information from each tracing and transmitting device through the base station via a real-time flight information-analyzing module of a flight information-analyzing device, and analyzing the real-time flight information to obtain flight information-analyzing data; immediately displaying both the real-time flight information and the flight information-analyzing data of each flight animal via a real-time flight information display module of the flight information-analyzing device.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF THE DRAWINGS

The various objects and advantages of the present invention will be more readily understood from the following detailed description when read in conjunction with the appended drawings, in which:

FIG. 3 is a flowchart of a method of using a real-time tracing, transmitting and analyzing system for flight animals according to the present invention.

DETAILED DESCRIPTION OF PREFERRED BEST MOLDS

Figure 1:
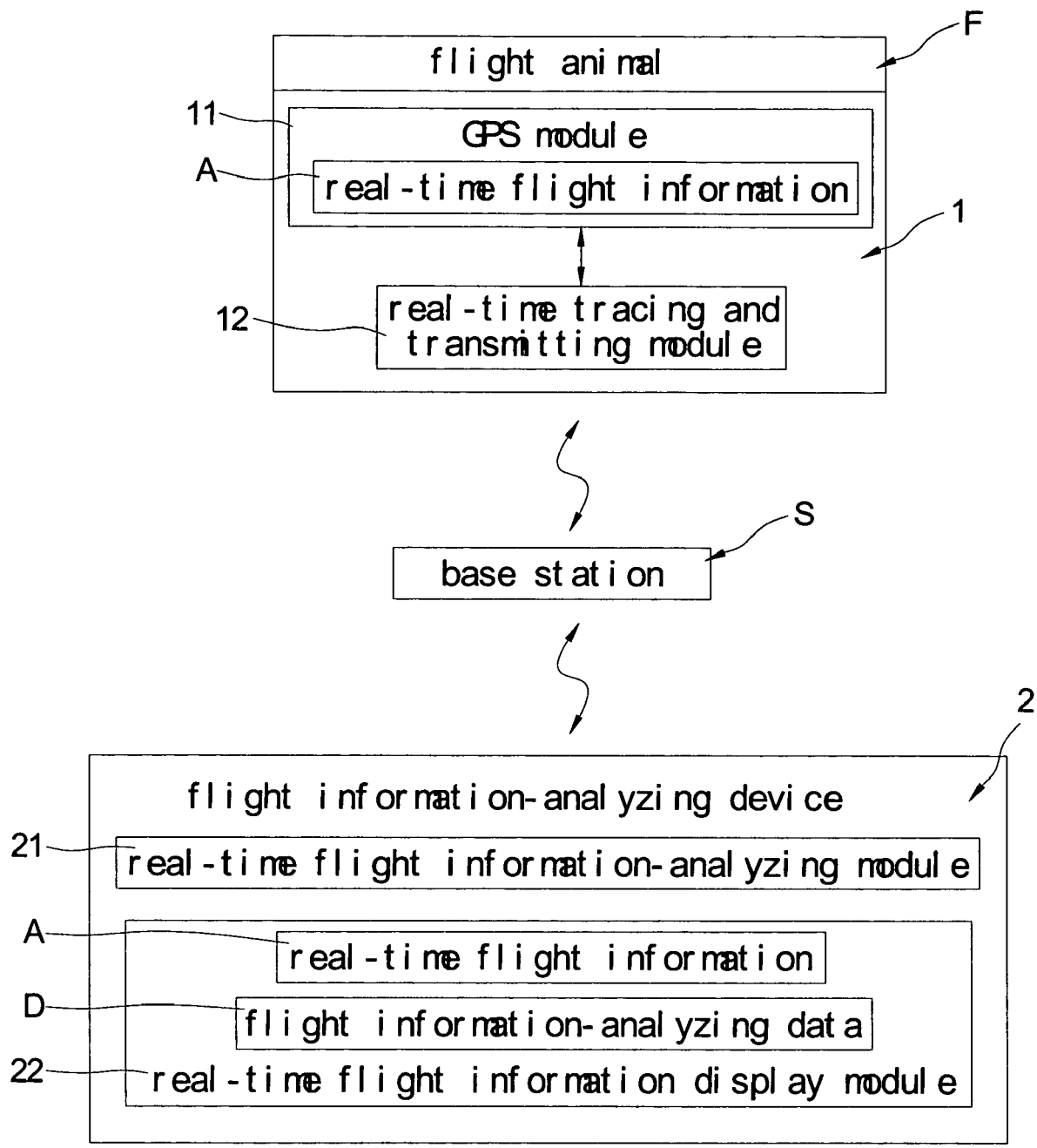
FIG. 1 is a function block diagram of a real-time tracing, transmitting and analyzing system for flight animals according to the present invention.
Figure 2:
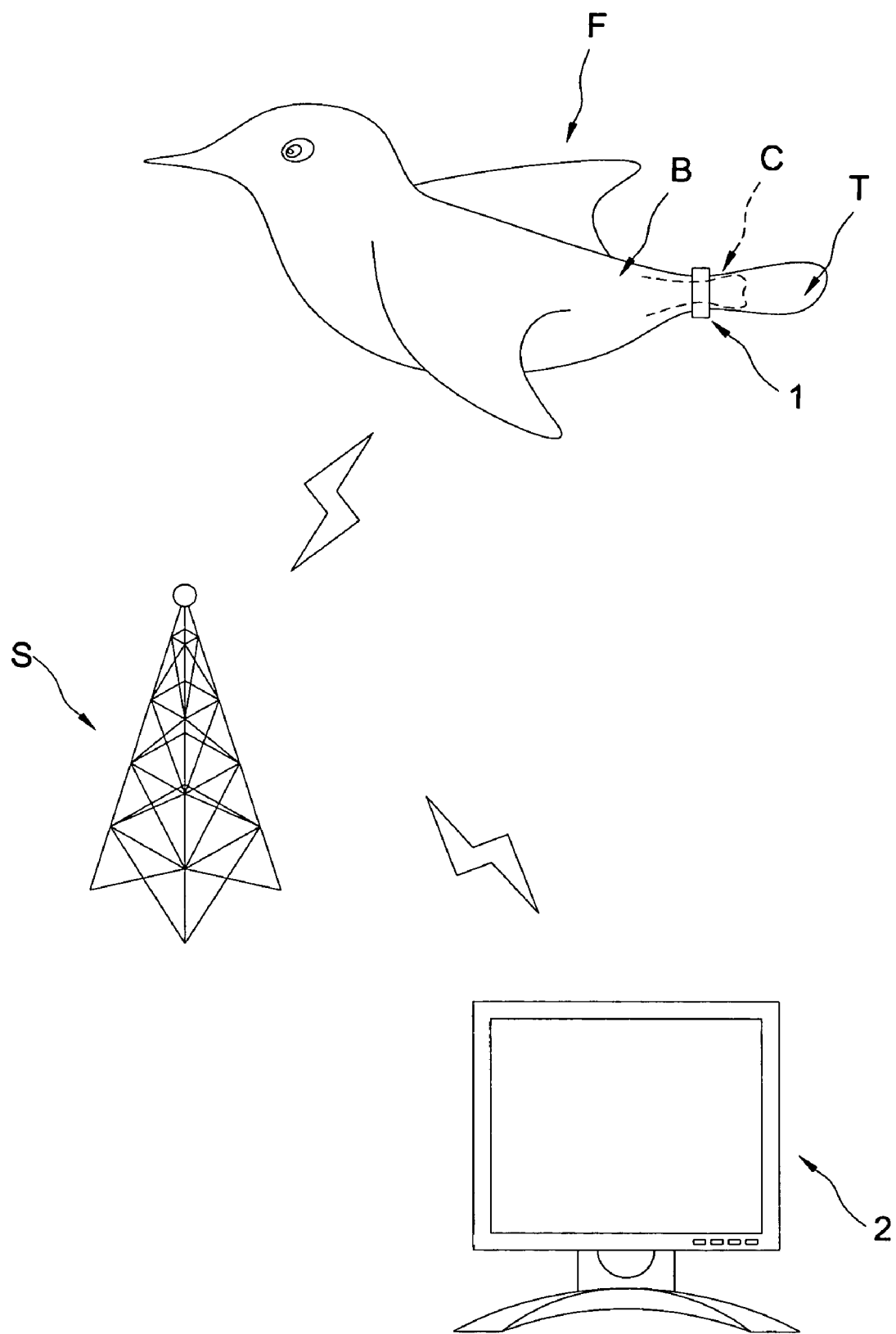
FIG. 2 is a usage status diagram of a tracing and transmitting device according to the present invention.

Referring to FIGS. 1 and 2, the present invention provides a real-time tracing, transmitting and analyzing system for flight animals, comprising: a plurality of tracing and transmitting devices 1 and a flight information-analyzing device 2.

Each tracing and transmitting device 1 is fastened on any position of the flight animal F (however, a concave ring portion C between a body B and a tail T of the flight animal F is especially suitable). Moreover, each tracing and transmitting device 1 has a weight of between 1 and 10 grams for reducing the drag upon the flight animal F (this is especially important if the flight animal is involved in a race, such as a pigeon race).

Furthermore, each tracing and transmitting device 1 has a GPS module 11 and a real-time tracing and transmitting module 12. The GPS module 11 is used to receive real-time flight information A of the flight animal F and the real-time tracing and transmitting module 12 is used to transmit the real-time flight information A regarding the flight animal F from the GPS module 11 to a base station S.

Moreover, the flight information-analyzing device 2 has a real-time flight information-analyzing module 21 and a real-time flight information display module 22. The real-time flight information-analyzing module 21 is used to immediately receive the real-time flight information A from each tracing and transmitting device 1 through the base station S and analyzes the real-time flight information A to obtain flight information-analyzing data D. The real-time flight information display module 22 is used to immediately display both the real-time flight information A and the flight information-analyzing data D from each flight animal F.

In addition, the real-time flight information A comprises: real-time location information, real-time height information and a real-time flight velocity. The real-time flight information A can further include the physical and mental state of the flight animal F as well. Moreover, the flight information-analyzing data D comprises information regarding how far each flight animal F still is to its destination.

Referring to FIG. 3, the present invention provides a method of using a real-time tracing, transmitting and analyzing system for flight animals. The method comprises: firstly, fastening a plurality of tracing and transmitting devices 1 on corresponding flight animals F, respectively (S100); next, receiving real-time flight information A regarding each flight animal F via a GPS module 11 from each tracing and transmitting device 1 (S102); next, transmitting the real-time flight information A regarding the flight animals F from the GPS module 11 to a base station S via a real-time tracing and transmitting module 12 of each tracing and transmitting device 1 (S104).

Furthermore, the method comprises: immediately receiving the real-time flight information A from each tracing and transmitting device 1 through the base station S via a real-time flight information-analyzing module 21 of a flight information-analyzing device 2; analyzing the real-time flight information A to obtain flight information-analyzing data D (S106); immediately displaying both the real-time flight information A and the flight information-analyzing data D regarding each flight animal F via a real-time flight information display module 22 of the flight information-analyzing device 2 (S108).

In conclusion, the tracing and transmitting device 1 has a weight between 1 and 10 grams and can be fastened on any part of the flight animal (however, the best position is the concave ring portion C between the body B and the tail T of the flight animal), for capturing real-time flight information A (such as real-time location information, real-time height information, a real-time flight velocity and the physical and mental state of the flight animal) regarding the flight animal F by using GPS 11.

Moreover, the real-time flight information A is transmitted via a base station S to a flight information-analyzing device 2 and is analyzed via the flight information-analyzing device 2 to obtain flight information-analyzing data D. Hence, the present invention can immediately display both the real-time flight information A and the flight information-analyzing data D regarding each flight animal for reference via the flight information-analyzing device 2. For example, in a pigeon race, breeders can obtain any real-time flight information that they desire regarding each flight animal.

Although the present invention has been described with reference to the preferred best molds thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A real-time tracing, transmitting and analyzing system for flight animals, comprising:
   a plurality of tracing and transmitting devices, each weighing between 1-10 grams, wherein each tracing and transmitting device is fastened on a concave ring portion between a body and a tail of a flight animal, and each tracing and transmitting device has a GPS module for receiving real-time flight information regarding the flight animal and a real-time tracing and transmitting module for transmitting the real-time flight information of the flight animal from the GPS module to a base station; and
   a flight information-analyzing device having a real-time flight information-analyzing module for immediately receiving the real-time flight information from each tracing and transmitting device through the base station and analyzing the real-time flight information to obtain flight information-analyzing data, and a real-time flight information display module for immediately displaying both the real-time flight information and the flight information-analyzing data for each flight animal.

2. The system as claimed in claim 1, wherein the real-time flight information comprises: real-time location information, real-time height information and a real-time flight velocity.

3. The system as claimed in claim 1, wherein the real-time flight information comprises a physical and mental state of the flight animal.

4. The system as claimed in claim 1, wherein the flight information-analyzing data comprises information regarding how far each flight animal is from a destination.

5. A method of using a real-time tracing, transmitting and analyzing system for flight animals, comprising:
   fastening a plurality of tracing and transmitting devices on a concave ring portion between a body and a tail of corresponding flight animals, respectively, wherein the weight of each tracing and transmitting device is between 1-10 grams;
   receiving real-time flight information regarding each flight animal via a GPS module of each tracing and transmitting device;
   transmitting the real-time flight information of the flight animal from the GPS module to a base station via a real-time tracing and transmitting module of each tracing and transmitting device;
   immediately receiving the real-time flight information from each tracing and transmitting device through the base station via a real-time flight information-analyzing module of a flight information-analyzing device, and analyzing the real-time flight information to obtain flight information-analyzing data; and immediately displaying both the real-time flight information and the flight information-analyzing data regarding each flight animal via a real-time flight information display module of the flight information-analyzing device.

6. The method as claimed in claim 5, wherein the real-time flight information comprises: real-time location information, real-time height information and a real-time flight velocity.

7. The method as claimed in claim 5, wherein the real-time flight information comprises a physical and mental state of the flight animal.

8. The method as claimed in claim 5, wherein the flight information-analyzing data comprises information regarding how far each flight animal is from a destination.

* * * * *